US011934386B2

(12) United States Patent
Marteau

(10) Patent No.: US 11,934,386 B2
(45) Date of Patent: Mar. 19, 2024

(54) MIGRATION OF A DATA BLOCKCHAIN

(71) Applicant: WORLDLINE, Puteaux (FR)

(72) Inventor: Hubert Marteau, Tours (FR)

(73) Assignee: WORLDLINE, Puteaux (FR)

(*) Notice: Subject to any disclaimer, the term of this patent is extended or adjusted under 35 U.S.C. 154(b) by 94 days.

(21) Appl. No.: 17/638,962

(22) PCT Filed: Aug. 21, 2020

(86) PCT No.: PCT/EP2020/073486
§ 371 (c)(1),
(2) Date: Feb. 28, 2022

(87) PCT Pub. No.: WO2021/043599
PCT Pub. Date: Mar. 11, 2021

(65) Prior Publication Data
US 2022/0300488 A1  Sep. 22, 2022

(30) Foreign Application Priority Data

Sep. 2, 2019 (FR) .................................. 1909624
Sep. 2, 2019 (FR) .................................. 1909627

(51) Int. Cl.
*G06F 17/30* (2006.01)
*G06F 16/21* (2019.01)
*G06F 16/23* (2019.01)
(52) U.S. Cl.
CPC ........ *G06F 16/2379* (2019.01); *G06F 16/214* (2019.01)

(58) Field of Classification Search
CPC ........ G06F 16/13; G06F 16/24; G06F 16/156; G06N 3/00; G06N 5/00; G05B 13/00
See application file for complete search history.

(56) References Cited

U.S. PATENT DOCUMENTS 11,734,655 B2 * 8/2023 Mallik ............... G06Q 20/3825
705/41
2018/0323963 A1 11/2018 Stollman
(Continued)

OTHER PUBLICATIONS

International Search Report for corresponding application PCT/EP2020/073486 filed Aug. 21, 2020; dated Oct. 8, 2020.

*Primary Examiner* — Hung D Le
(74) *Attorney, Agent, or Firm* — CANTOR COLBURN LLP

(57) ABSTRACT

A method for migration of a blockchain to be replaced, called the first blockchain, to a replacement blockchain, called the second blockchain. The migration method comprises: an initialisation of the second blockchain, the initialisation comprising a generation, in a main blockchain configured to supervise access to the first and second blockchains, of a zone of supervision (250) of the second blockchain; the entry of a user comprising a registration in a directory of users in the main blockchain of a secondary address allocated to this user for the connection to the second blockchain; a generation in the second blockchain of a set of blocks of data corresponding to an image of the first blockchain; a switch of all or some of the users of the first blockchain to the second blockchain so as to prevent registration of transactions in the name of these users in the first blockchain and to permit the registration of transactions in the name of these users in the second blockchain.

13 Claims, 9 Drawing Sheets

(56) References Cited

U.S. PATENT DOCUMENTS

| | | | |
|---|---|---|---|
| 2019/0182047 A1* | 6/2019 | Andreina | H04L 63/0428 |
| 2019/0370223 A1* | 12/2019 | Yang | G06F 3/0647 |
| 2020/0057565 A1* | 2/2020 | Sanghvi | G06F 3/0619 |
| 2020/0074450 A1* | 3/2020 | Fletcher | G06Q 20/3829 |
| 2020/0076827 A1* | 3/2020 | Gluck | G06Q 20/0655 |
| 2020/0142965 A1* | 5/2020 | Weldemariam | G06F 16/27 |
| 2020/0162263 A1* | 5/2020 | Iyer | G06F 16/27 |
| 2020/0213128 A1* | 7/2020 | Sharma | H04L 9/0643 |
| 2020/0234257 A1* | 7/2020 | Mallik | G06Q 20/0658 |
| 2020/0235911 A1* | 7/2020 | Safak | H04L 9/3247 |
| 2021/0014042 A1* | 1/2021 | Sivathanu | H04L 9/0637 |
| 2021/0048999 A1* | 2/2021 | Bregman | G06F 8/65 |
| 2021/0072928 A1* | 3/2021 | Winarski | G06F 3/0649 |
| 2021/0073212 A1* | 3/2021 | Conley | H04L 9/3213 |

* cited by examiner

[Fig. 1A]
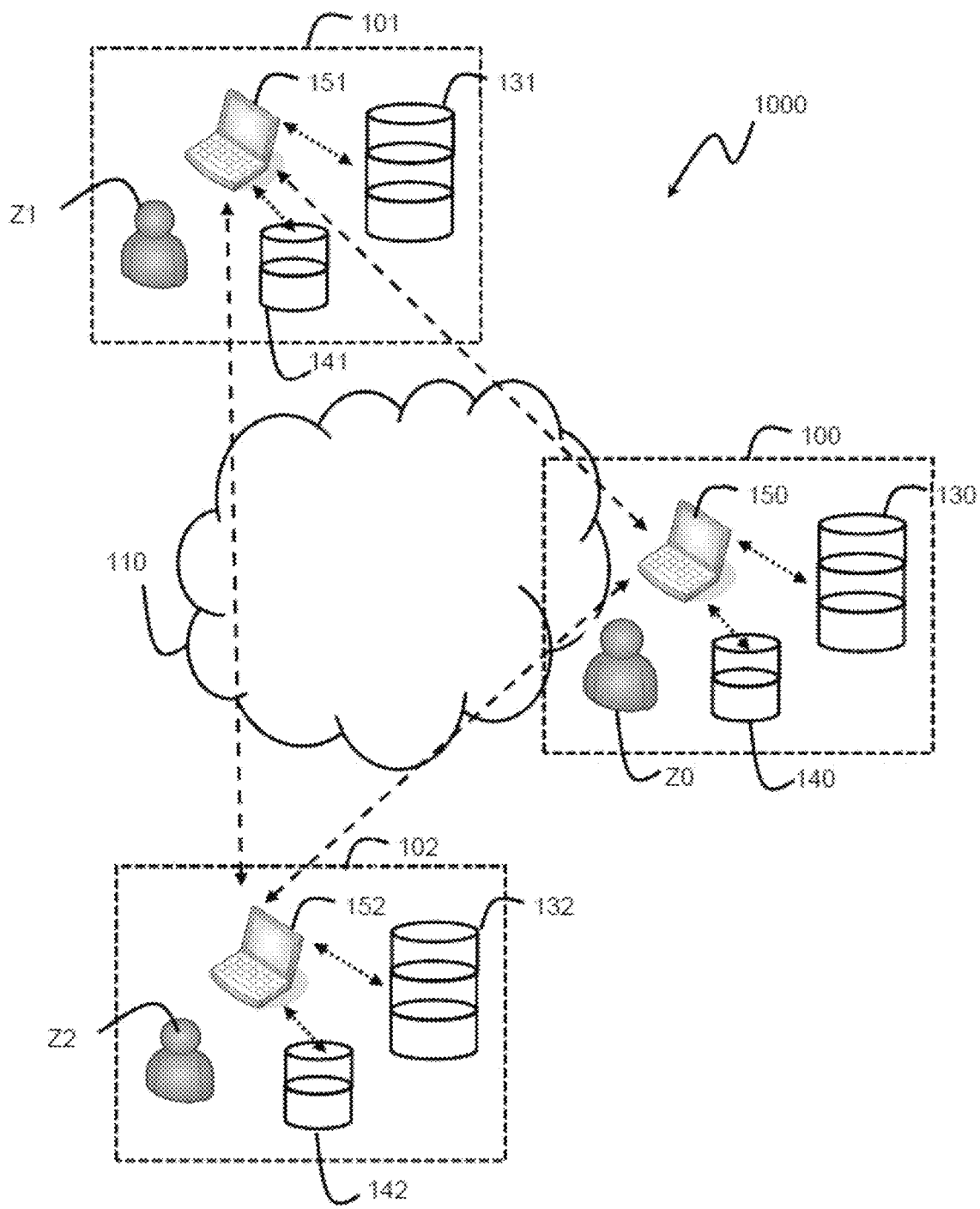

[Fig. 1B]
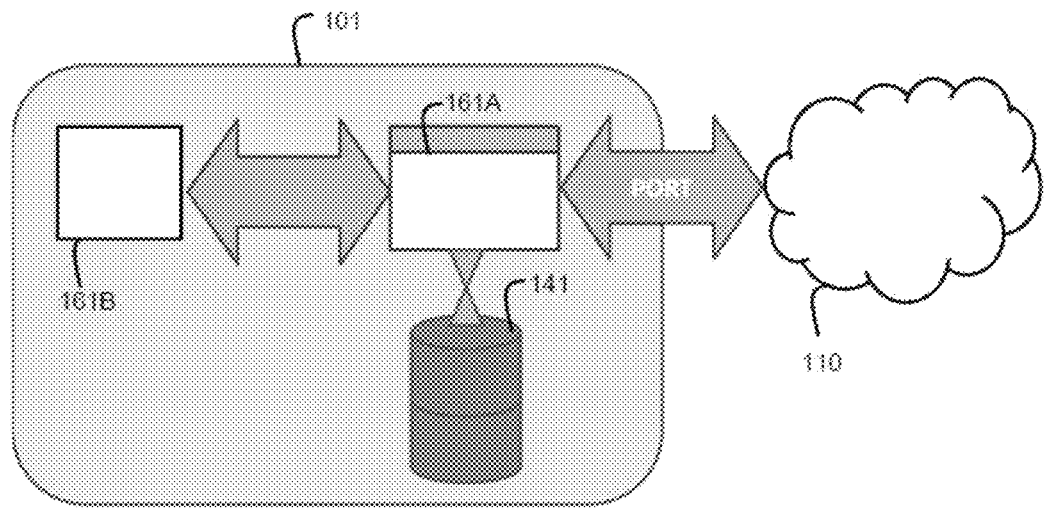
[Fig. 1C]
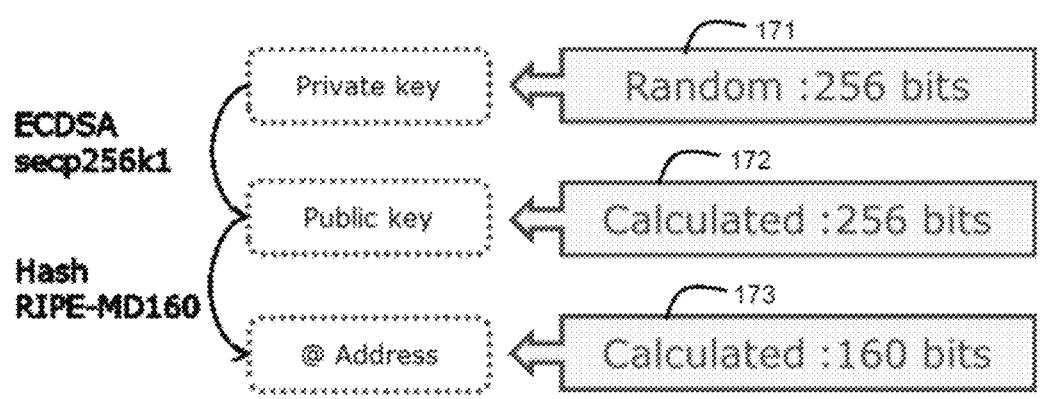

[Fig. 1D]
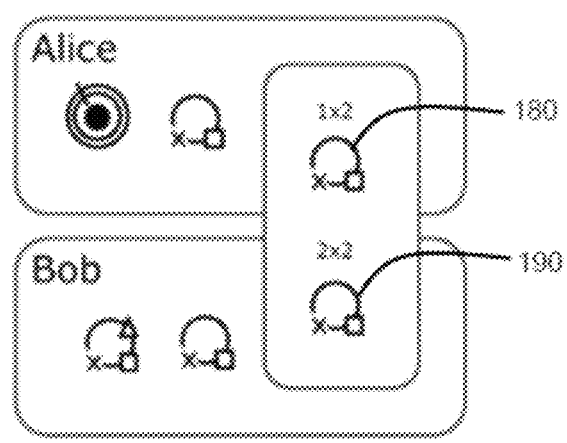

[Fig. 2A]
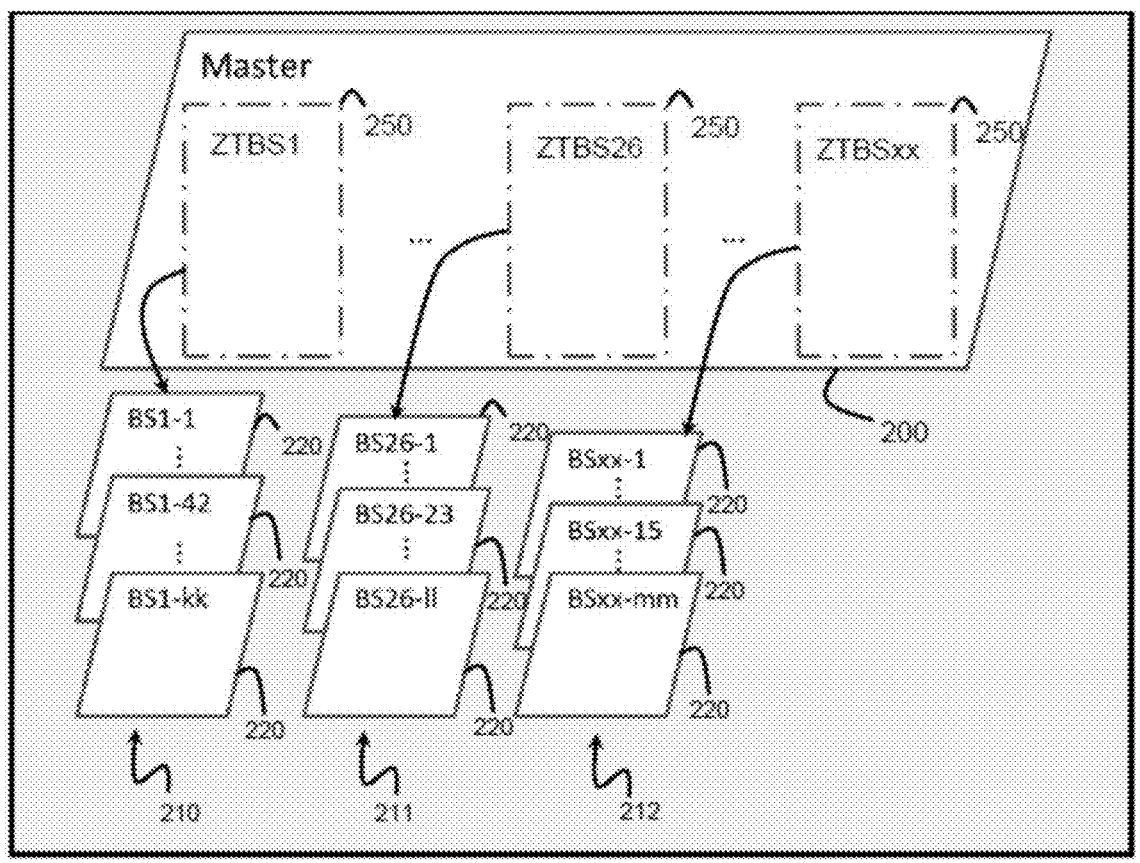

[Fig. 2B]
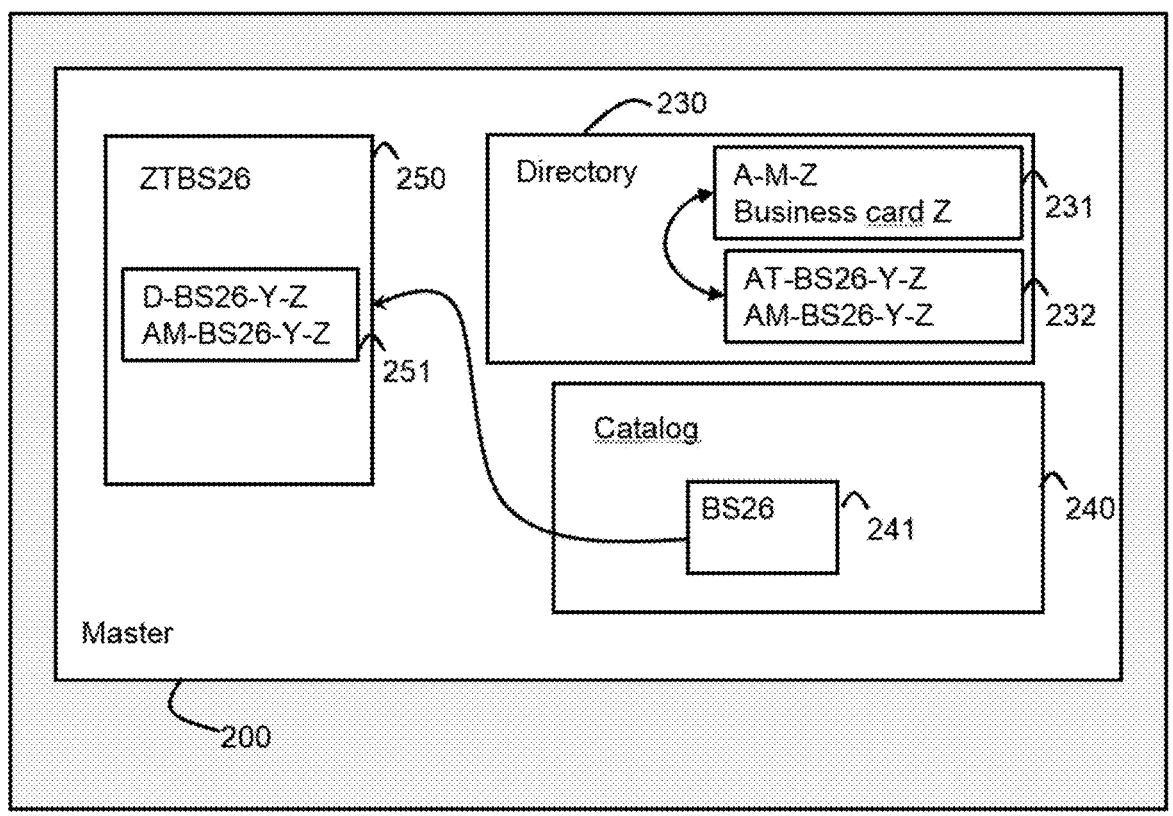

[Fig. 3A]
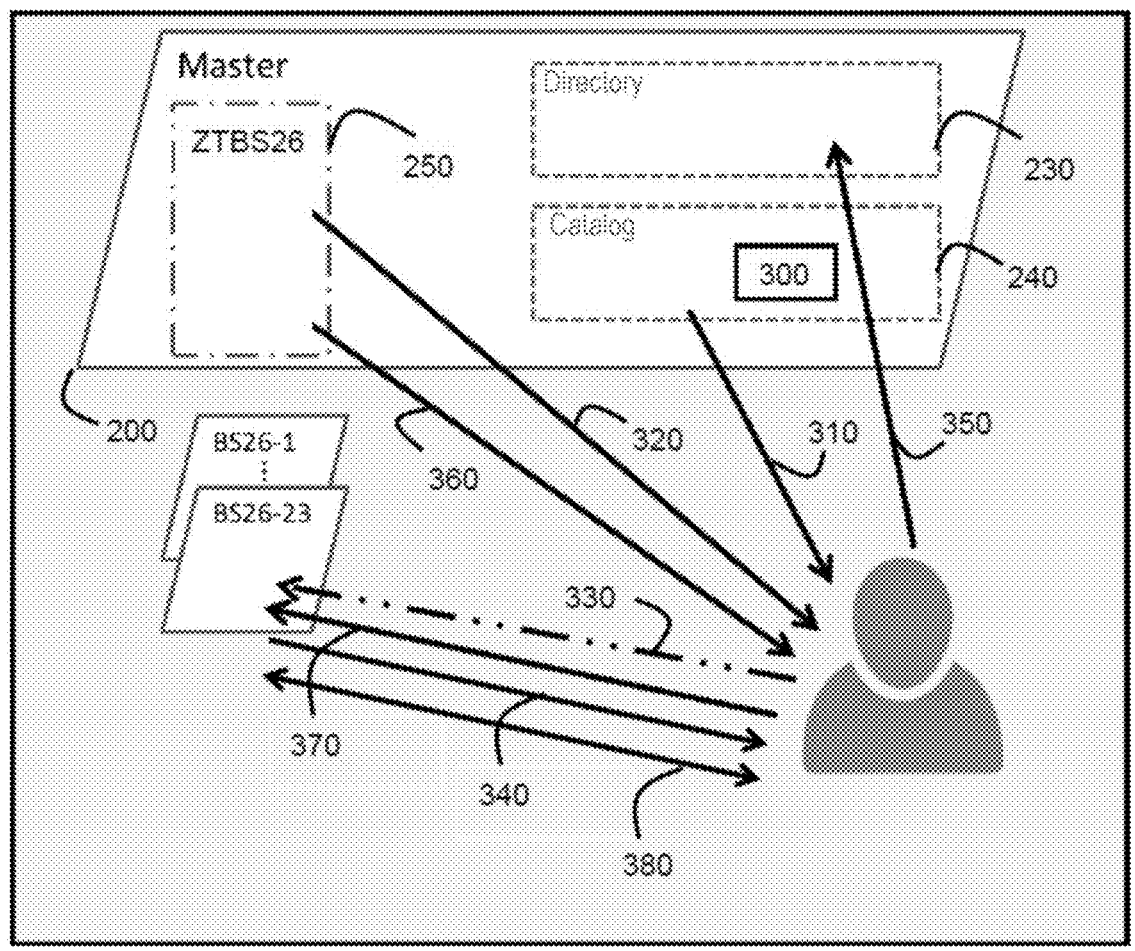

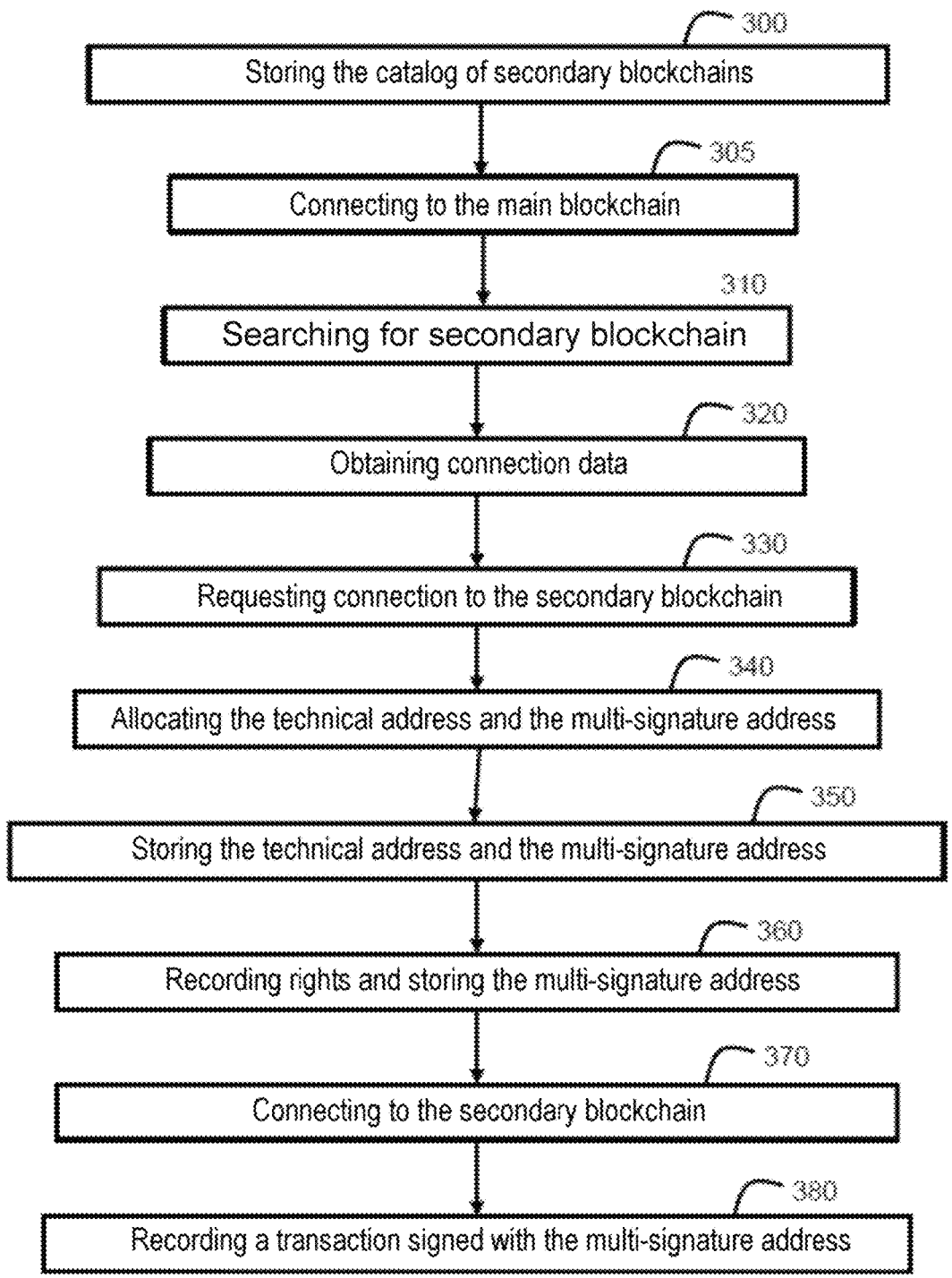
[Fig. 3B]

[Fig. 4A]
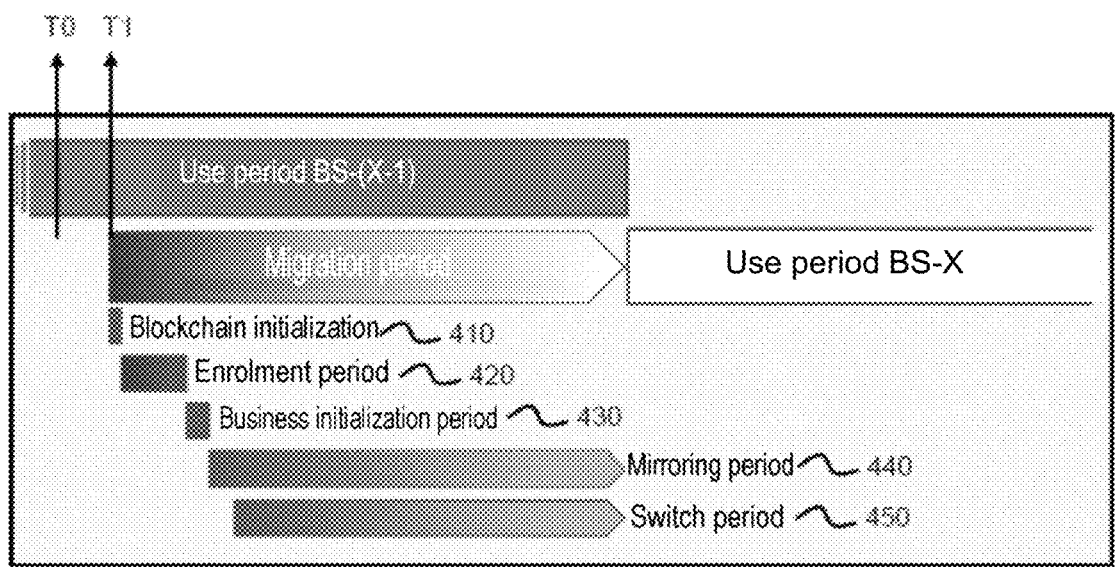

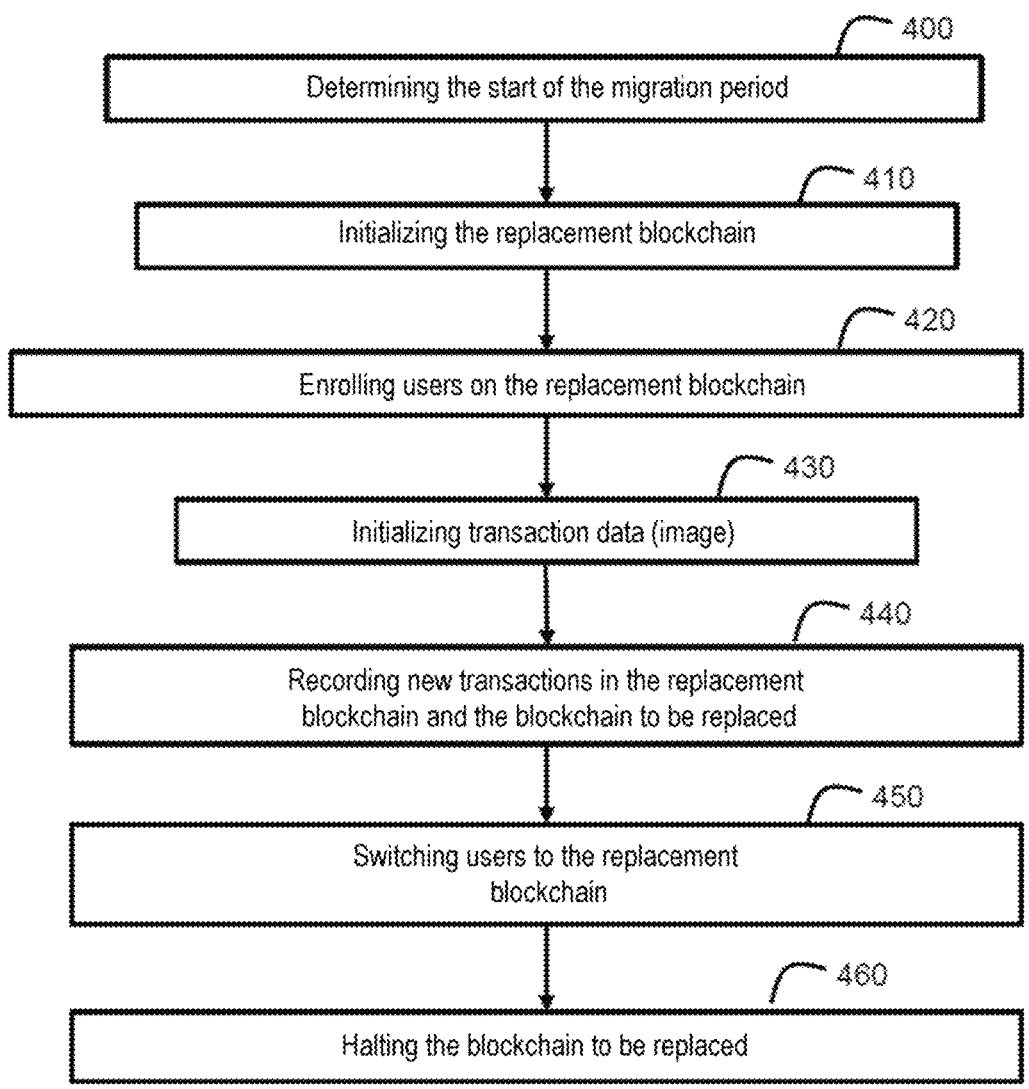

MIGRATION OF A DATA BLOCKCHAIN

FIELD OF THE INVENTION

The invention relates to the field of blockchains and more particularly to a technique for migrating one or more blockchains.

PRIOR ART

The technology of storing data using blockchains is a technology that founds the confidence that may be had in the stored data on the history of the data. A priori, it is impossible to delete any datum stored in a blockchain. Consequently, a blockchain only increases in storage size. However, systems generally have a limited storage capacity which cannot therefore cope with the potentially infinite growth of a blockchain.

A blockchain indexes data deemed important. Every block, every transaction, every address, for example, is a key indexed for fast access to the data. In contrast, the more keys an index contains, the lower its performance becomes. As a blockchain only increases in storage size, the more it is used, the more stale data it stores and the lower its performance becomes.

There thus appears a need to remedy all or some of the problems, drawbacks or shortcomings of the prior art and/or to make improvements thereto.

SUMMARY

According to a first aspect, the present description relates to a method for migrating a blockchain to be replaced, called the first blockchain, to a replacement blockchain, called the second blockchain, the method being implemented by one or more computers. The migrating method comprises: initializing the second blockchain, initializing comprising generating, in a main blockchain configured to supervise access to the first and second blockchains, a supervisory zone of the second blockchain; enrolling one or more users on the second blockchain, enrolling a user comprising storing, in a user directory in the main blockchain, a secondary address allocated to this user for connection to the second blockchain; generating, in the second blockchain, a set of data blocks corresponding to an image of the first blockchain, the image corresponding to a determined point in time in the history of the first blockchain; switching all or some of the users from the first blockchain to the second blockchain so as to prohibit transactions from being recorded in the name of these users in the first blockchain and to permit transactions to be recorded in the name of these users in the second blockchain.

In one or more embodiments, the method according to the first aspect comprises recording new transactions for which the first blockchain has received a record request both in the first blockchain and in the second blockchain during a period, which is referred to as the mirroring period, before said switching. This makes it possible to avoid an abrupt switch from one blockchain to another and to provide a period during which users will be able individually, each according to his needs, to pass from the first blockchain to the second blockchain.

In one or more embodiments, the method according to the first aspect comprises permanently switching to the second blockchain by modifying the rights of the users to the first blockchain, so that no more transactions may be recorded in the first blockchain and any new transaction is recorded only in the second blockchain.

In one or more embodiments, in the method according to the first aspect, the supervisory zone of the second blockchain is configured to record user rights to the second blockchain.

In one or more embodiments of the method according to the first aspect, the first blockchain is implemented in a communication system comprising a plurality of nodes and one instance of the first chain in each node, the method comprising, for at least one node of the communication system, following the permanent switch, deleting the instance of the first blockchain located in the node in question.

In one or more embodiments, the method according to the first aspect comprises allocating each user of the second blockchain a multi-signature address for signing transactions to be recorded in the second blockchain in the name of that user, the multi-signature address being generated on the basis of the secondary address allocated to this user for connection to the second blockchain and an administrator address of the second blockchain.

In one or more embodiments of the method according to the first aspect, the secondary address allocated to a user for connection to the second blockchain is stored in the user directory in association with the multi-signature address.

In one or more embodiments of the method according to the first aspect, the multi-signature address is used to record new transactions in the second blockchain during the mirroring period.

In one or more embodiments of the method according to the first aspect, the rights of a user to the second blockchain are recorded in the supervisory zone in association with the multi-signature address allocated to that user.

In one or more embodiments of the method according to the first aspect, generating the image of the first blockchain comprises storing, in the second blockchain, a set of data blocks representative of asset units held by one or more users of the first blockchain at the determined point in time.

In one or more embodiments, the method according to the first aspect comprises storing, in the main blockchain, a marker for each user indicating whether or not that user has switched to the second blockchain.

The various embodiments mentioned above may be combined with one another, with regard to implementation of the method according to the first aspect.

According to a second aspect, the present description relates to a computational device or computer system comprising means for implementing the method according to the first aspect. These means may comprise one or more processors and one or more memories comprising a computer program code, the one or more memories and the computer program code being configured to, with the one or more processors, cause the device to execute the steps of the method according to the first aspect. For example, the one or more memories comprise a computer program comprising instructions configured to cause the device to execute the steps of the method according to the first aspect.

In one or more embodiments, the various steps of the method according to the first aspect are implemented by one or more computer programs.

According to a third aspect, the present description thus relates to a data storage medium readable by a processor on which is stored a computer program comprising instructions for executing the steps of a method according to the first aspect are implemented by one or more computer programs.

According to a fourth aspect, the present description thus relates to a computer program product comprising instructions for executing the steps of a method according to the first aspect when the computer program is executed by a data processor.

BRIEF DESCRIPTION OF FIGURES

Other aims, features and advantages of the invention will become apparent from the following description, which is given merely by way of non-limiting example, with reference to the appended drawings, in which:

FIG. 1A schematically represents a communication system comprising blockchains;

FIG. 1B schematically illustrates aspects of a node of a communication system according to FIG. 1A;

FIG. 1C illustrates aspects of generation of a user address;

FIG. 1D illustrates aspects of generation of a multi-signature address;

FIG. 2A schematically shows the relationships between a main blockchain and secondary blockchains;

FIG. 2B schematically shows the relationships between a main blockchain and secondary blockchains with respect to management of the rights and addresses of a user;

FIG. 3A schematically illustrates aspects of a method for connecting a user to a secondary blockchain;

FIG. 3B shows a flowchart of a method for connecting a user to a secondary blockchain according to one or more embodiments according to one or more embodiments;

FIG. 4A schematically illustrates aspects of a method for migrating from a secondary blockchain to be replaced to a replacement secondary blockchain;

FIG. 4B shows a flowchart of a method for migrating a secondary blockchain to be replaced to a replacement secondary blockchain according to one or more embodiments.

DETAILED DESCRIPTION

As known, blockchains may be used to record any type of transactions. To provide context, a blockchain is generally defined as being a digital ledger of transactions. The blockchain (this digital ledger) "grows" as data blocks are stored therein, these data blocks corresponding to new transactions or sets of new transactions that are added to the blockchain. New data blocks corresponding to new transactions are stored in the blockchain after a validation process that is specific to each blockchain.

The term "transaction" may cover any type of operation between one or more actors. It may relate to any type of product or item, device component, package and/or physical or electronic document or file, including virtual assets such as data, electronic files, intangible assets or even cryptocurrency. The so-called "blockchain" technology allows a digital ledger of operations that is non-repudiable and tamper-proof to be created.

FIG. 1A schematically shows a communication system 1000 for implementing blockchains, in the case of a decentralized architecture. This communication system 1000 comprises a plurality of nodes 100, 101, 102 that communicate with each other through a communication network 110. These nodes are generally organized in a network of peers. This figure presents an exemplary network illustrating the "decentralized" nature of the blockchain and the relationships between nodes of the network (peer-to-peer network). This figure schematically illustrates one possible architecture of a network for exploiting and/or using one or more blockchains. Another architecture or infrastructure could be chosen.

Each node 100, 101, 102 of the communication system 1000 may correspond to one or more physically separate computational devices, implementing software corresponding to one or more application software packages. This software implements, in the node in question, the functionalities of a blockchain and accesses one or more data sets to store the data blocks of the blockchain in question.

For each node 100, 101, 102 of the communication system 1000, the data blocks may be stored in a distributed manner (in this case a "distributed ledger" is referred to), for example in one or more sub-nodes of a local network in the node in question.

In a simplified manner and by way of example, in the case of FIG. 1A, the node 100 comprises a computational device 150, which implements the functionalities of two blockchains 130, 140 and which accesses two data sets 130, 140, which correspond to these two blockchains 130, 140, respectively. Likewise, the node 101 comprises a computational device 151, which implements the functionalities of two blockchains 131, 141 and which accesses two data sets 131, 141, which correspond to these two blockchains 131, 141, respectively. Likewise, the node 102 comprises a computational device 152, which implements the functionalities of two blockchains 132, 142 and which accesses two data sets 132, 142, which correspond to these two blockchains 132, 142, respectively.

Each computational device 150, 151, 152 may be implemented by one or more physically separate machines. The computational device 150 may on the whole have the architecture of a computer, and include components of such an architecture: one or more memories, one or more processors, a communication bus, one or more hardware interfaces for connecting this device to a network or another piece of equipment, one or more user interfaces, etc.

Each computational device 150, 151, 152 is configured to communicate via the communication network 110 with the other nodes 100, 101, 102 of the communication system and implements all or some of the functions of one or more associated blockchains 130, 131, 132 and/or 140, 141, 142.

In the case of a permissioned blockchain (with rights management), each computational device 150, 151, 152 implements functions for enrolling users, for allocating rights to the blockchain, for allocating user addresses, for controlling access to the blockchain, for signing and recording transactions, for reading and writing data sets or data blocks, etc., according to what is described in this document with respect to the blockchain in question.

For a given blockchain, a node 100, 101, 102 may be a full node or a light-weight node. If the node 100, 101, 102 is a full node, the node stores locally (in one of the local data sets) all the data blocks of the blockchain: the data blocks are in this case duplicated as many times as there are nodes.

In the example of FIG. 1A, if it is assumed that the blockchain 130 (140, respectively) is initially created by an administrator Z0 by means of the computational device 150, then each of the blockchains 131 and 132 (141 and 142, respectively) are one instance of the same blockchain 130 (140, respectively). If node 100, 101, 102 is a light-weight node, the node stores locally only the data blocks of that node's user Z0, Z1, or Z2. The invention described in this document is applicable whatever the type of node.

If, for example, a user Z1 of the node 101 wishes to connect to a blockchain 130, he will establish, by means of a computational device 151, a connection via a telecommunication network to the computational device 150 corresponding to an administrator Z0 of the targeted blockchain. If the node 101 is a full node, a full copy of the blockchain 130 will be created in node 101 after the first connection and after this user Z1 has been granted rights to the blockchain 130. Each following new user Z2, Z3, etc. will be able to connect to any one of the nodes 100 or 101 already created.

FIG. 1B schematically illustrates the principle of update of the blockchains in the exemplary case of a blockchain 141 and of a node 101. This figure schematically illustrates one possible architecture of a computer system for exploiting and/or using a blockchain. FIG. 1B shows an example of a local node serving to illustrate the "autonomous" nature of the blockchain, data being stored locally by each node and updated by the network and requiring an "interface" to be used by the local node. Another physical/hardware architecture or structure could be envisioned.

It is assumed here that the blockchains 140, 141, and 142 are instances of the same blockchain 141. For a given blockchain, each node 101 (100, 102, respectively) comprises a software package 161 (160, 162, respectively) that implements all the functions associated with the blockchain in question. This software package 161 (160, 162, respectively) may comprise at least one first software subset 161A (160A, 162A, respectively) configured to perform operations of writing and reading data blocks and operations of synchronization with the other instances of the blockchain in other nodes. Depending on what is requested by the user of the node 101, the software subset 161A locally updates the instance 141 of the blockchain in question by storing one or more new data blocks. As known, via a synchronization mechanism implemented through the communication network 110 connecting the various nodes 100, 101, 102, the other instances 140 and 142 of this blockchain are updated by storing these new data blocks in the other nodes 100 and 102 respectively managing these other instances 140 and 142 of the blockchain. In the case of light-weight nodes, this update may be limited solely to the data blocks in question. The software package 161 may also comprise at least one second software subset 161B (160B, 162B, respectively), which is reliant on the first software subset 161A and configured to implement the various functionalities described in this document. The software package 161 (160, 162, respectively) may further comprise at least one third software subset 161C (not shown), which is reliant on the first and second software subassemblies 161A and 161B and configured to implement user-interface functionalities.

The software of a blockchain may correspond to one or more application software packages and one or more computational devices. Each software subset of the software of a blockchain may correspond, for example, depending on the software architecture chosen, to an autonomous application software package within the software, or indeed to an application layer within the software or even to one or more software components within the software. It is possible to envisage any other architecture. Each operation performed on a given blockchain is performed by means of the software associated with this blockchain, which is executed by the computational device of one of the nodes. For example, the operations performed by a user Z1 on a given blockchain will be performed by means of the software package 161 associated with the blockchain in question, which will be executed by the computational device 151 of the node 101 associated with the user Z1.

In the same way, the blockchains 130, 131, and 132 may be instances of the same blockchain and a synchronization mechanism is then implemented for these instances 130, 131, 132 through the communication network 110 connecting the various nodes 100, 101, 102.

Each data block stored in a blockchain 130, 131, 132 or 140, 141, 142 may be accessed by one or more users depending on the rights of these users Z0, Z1, Z2 to this data block.

The confidence in blockchains is, in particular, founded on the accountability of every user, all of whom is fully in charge of their own data management. A user may therefore be able to create data sets—if this is the case then he is the legitimate owner of the data set, and no one other than him may create new data within this data set. In addition, everyone has, at his own address, which is not accessible to any other actor, the data that he has received. It is therefore, a priori, impossible, regardless of the level of rights of the person carrying out the action, to carry out an action as someone else, while leaving everyone autonomy with respect to similar actions.

The rights of users to a blockchain are defined for the various user addresses of the permissioned blockchain. A user address (173) corresponds to a personal identifier on the blockchain (similarly to an email address on a mail server).

FIG. 1C illustrates the principle of generation of a user address (173) for a blockchain. The user address (173) of a user entity (or user) of the blockchain may be considered the (unique) identifier of this entity. This user address (173) is generally, in the case of asymmetric encryption, generated from a public signature key (172) (and therefore from the private key (171) since the public key (172) is in general computed from the private key (171)). A user address (173) may be used by a user entity such as: a natural person, a script or any system, whether autonomous or not, that may connect to a blockchain.

FIG. 1C in particular illustrates the dependency between the private key (171), the public key (172) and the associated signature. The private key (171) is for example generated randomly, then, by a first algorithm (for example ECDSA, Elliptic Curve Digital Signature Algorithm), the public key (172) is generated from the private key (171), then, by a second algorithm (for example a hash function), the user address is generated from the public key (172).

Generally, a blockchain user may manage a plurality of user addresses, these user addresses being kept in a wallet.

In a blockchain, it is possible to distinguish between various asset classes (or object classes). For example, the term "Bitcoin" usually refers to a blockchain that contains only one category of assets of the same name: Bitcoin. Newer blockchain systems allow various asset classes to be created according to user needs. The object class is generally the property of a single user address belonging to the user who created this object class and, in this case, only this user is able to generate new asset units for this asset. In the case of the Bitcoin blockchain, each user owns a Bitcoin asset.

Asset units are the units used to quantify each asset in an asset class. For example, if an asset corresponds to a class "Apple", the asset unit corresponds to one "apple". The asset units are held at addresses that have received these asset units, for example following transactions carried out by the blockchain. An instance of an object class, indicating a number of units of an asset of a given category, is the property of one and the same user address (173), i.e. is the property of a single user to whom this user address (173) has been assigned. If a user owns asset units, only he is able to transmit or carry out operations on the asset units that he owns.

Blockchain processors are processes that convert the status of transactions from "unconfirmed" to "confirmed";

these processors are for example miners in the case of a proof-of-work blockchain. By definition, the processors may only accept (confirmation) technically complete and valid transactions. A partial transaction cannot be accepted by processors and therefore cannot be stored, as a transaction, in a blockchain.

Permissions (or user rights) define the rights of a user address (173) to a permissioned blockchain. These permissions indicate whether the address is able to connect to the blockchain, whether it may send and/or receive transactions, and whether it has the ability to create assets. The present description pertains both to permissioned systems and to so-called permissionless systems, i.e. systems with absolutely no restrictions on the rights of any user present or future.

Examples of rights that may be granted to one or more user addresses of the blockchain are schematically illustrated in FIG. 1D and may comprise:

- connection rights for a user address (173) having the right to connect to the blockchain (this set of rights is named "Connect" in FIG. 1D); this set of rights includes read rights—a user may therefore read the data blocks;
- send rights for a user address (173) having the ability to send new blockchain transactions (the right to connect is implicitly possessed) (this set of rights is named "Send" in FIG. 1D);
- receive rights for a user address (173) having the ability to receive new blockchain transactions (the right to connect is implicitly possessed) (this set of rights is named "Receive" in FIG. 1D);
- asset creation rights for a user address (173) having the right to create new assets in the blockchain (the send and receive right is implicitly possessed) (this set of rights is named "Issue" on FIG. 1D);
- block creation rights for a user address (173), providing for management of the creation of new blocks in the blockchain (this set of rights is named "Miner" in FIG. 1D);
- administrator rights, with which it is possible to give and withdraw various rights to/from any address (this set of rights is named "Admin" in FIG. 1D);
- blockchain creator rights, which include at least administrator rights (this set of rights is named "Origin Node" in FIG. 1D).

FIG. 1D further illustrates the principle of generation of a multi-signature address (180, 190) fora plurality of blockchain users. A multi-signature address (180, 190) may be used to sign transactions in a blockchain. A multi-signature address (180, 190) may take various forms depending on the blockchain in question. A multi-signature address (180, 190) is an address, use of which is reserved for a predefined number of authorized signatories (or users). A multi-signature address (180, 190) is generated from the signatures of authorized signatories. A multi-signature address (180, 190) is defined by the number of signatures required to confirm a transaction by means of that multi-signature address (180, 190) and the list of the associated authorized users (or signatories) associated with those signatures. A multi-signature address (180, 190) is an address, used fora transaction, that may be signed by P different public signature keys (P may be 1 public signature key) associated with the authorized signatories and that must be signed by at least S public signature keys (S may be 1 public signature key) associated with the authorized signatories, with S<=P. Thus, a multi-signature address (180, 190) is noted with (S×P) to indicate the number (S) of signatures necessary among the (P) possible public keys.

For example, if two signatories Alice and Bob have the right to sign a multi-signature address (180), then the number of signatures required for a transaction involving these two signatories is at least 1 (multi-signature address 180) and at most 2 (multi-signature address 190). If the number of required signatures is 1, then any transaction created with the multi-signature address (180) may be confirmed if it possesses only one signature. If the number of signatures required is 2, then any transaction created with the multi-signature address (180) will require 2 signatures (one signature per signatory) in order to be confirmed. Any transaction carried out with a multi-signature address (180) bears the fingerprint of the signature of the address from which the signature originated. For example, if Alice and Bob each possess one address, a multi-signature address (180) may be generated and if this multi-signature address (180) requires only the signature of Alice or Bob, then for any transaction involving the multi-signature address (180) and bearing only one signature, any user who may consult the transaction will be able to determine whether the transaction was signed by Alice or by Bob.

As shown in FIG. 1D:

- the rights allocated to Alice are the rights "Miner", "Origin node" for a first address and "Send" and "Receive" for a second address;
- the rights allocated to Bob are the rights "Send", "Issue" and "Receive" for a first address, and the rights "Send" and "Receive" for a second address;
- the rights associated with the multi-signature address may be assigned as required; in the example of FIG. 1D, the associated rights correspond to the rights named "Send" and "Receive".

Main Blockchain and Secondary Blockchain

In the context of the present description, the notions of main blockchain (also called the master blockchain or, more simply, just the master) and of secondary blockchain are used. The master is the main blockchain, which has a supervisory function as regards the secondary blockchains. The master in particular stores supervisory technical information allowing the secondary blockchains to be supervised—for example: user addresses, rights associated with users, connection parameters, etc.

Secondary blockchains are blockchains that store application information—for example the information required by systems/projects/applications respectively associated with each of these secondary blockchains. These secondary blockchains therefore generally contain no supervisory technical information, contrary to the master.

For any situation in which a system cannot support a blockchain of infinitely increasing size, the present description provides a method for migrating blockchains. This migrating method is applied to secondary blockchains supervised by a master blockchain or master.

During such a migrating method, one secondary blockchain is replaced by a second secondary blockchain. The migrating method may subsequently be applied to this second secondary blockchain so that this second secondary blockchain is itself replaced by a third secondary blockchain and so on. A secondary blockchain thus succeeds a previous secondary blockchain and the blockchains thus form a temporal succession (or time series) of secondary blockchains. One time series of blockchains is for example denoted BS26, and two successive blockchains with indexes 41 and 42 in the time series BS26 will be denoted for example BS26-41 and BS26-42. The index of the blockchain starts for example at 1 (BS26-1) for the initial blockchain and has, a priori, no limit. For the blockchain time series BS26, a secondary blockchain (220) of any Y index will be denoted BS26-Y, the previous secondary blockchain (220) in the time series will be denoted BS26-(Y−1), and the next secondary blockchain (220) in the time series will be denoted BS26-(Y+1). The index Y thus corresponds to a version number of the blockchain BS26-Y.

Supervisory technical data are stored by the master (200) for each secondary blockchain (220) supervised by the master (200). The supervisory technical data comprise creation parameters of a secondary blockchain (220) and migration parameters.

The creation parameters of a secondary blockchain (220) are a set of parameters that define criteria for creating blockchains or a time series of blockchains and migration parameters of blockchains within a time series. These creation parameters may be modified over time but are, by nature, defined to last a relatively long time, and at least for the time of use of a blockchain of a time series.

The creation parameters of a blockchain may comprise: a description of the blockchain and/or a maximum size and/or a minimum size and/or a migration trigger size and/or a migration frequency and/or a switch time range and/or an end of migration. Parameters such as maximum size and/or minimum size and/or migration trigger size and/or migration frequency and/or switch time range and/or end of migration serve as migration parameters. These creation parameters are described in more detail below.

Parameters such as maximum size and/or a minimum size and/or a migration trigger size and/or a migration frequency and/or a switch time range and/or an end of migration are migration parameters. The migration parameters are used to determine when a secondary blockchain must be migrated and the duration of this migration operation, so that a migration start date on which the migrating method must be triggered may be deduced.

The description of a blockchain may comprise a general description valid for the entire time series, for example comprising information specific to the blockchain time series in question and/or a description specific to a specific blockchain of a time series. All of the information contained in the description is sufficiently exhaustive or explicit to allow a user to determine whether he is interested in this time series or one blockchain in particular.

The maximum size of a blockchain is the maximum size allocated to this blockchain before this blockchain is replaced by another blockchain.

The minimum size of a blockchain is the minimum size allocated to this blockchain before this blockchain is replaced by another blockchain.

The migration trigger size of a blockchain is the size desired for that blockchain in order to trigger the replacement of that blockchain. If the system follows a progression close to a linear progression then a prediction system may be set up to determine, in advance, the moment when this size will be reached. The migration trigger size is greater than or equal to the minimum size and it is less than or equal to the maximum size. A migration frequency, expressed in units of time, may also be used instead of the migration trigger size to set the time after which the blockchain must be replaced.

The migration trigger size may be specified in the form of an interval in order not to force a change at a time that is inconvenient for the application projects/systems. The switch time range allows one or more time ranges in which replacement of the blockchain will be best accepted by the application projects/systems to be specified.

At the end of the switch time range, the blockchain to be replaced is halted and only the replacement blockchain is kept. The end of migration is therefore computed as the moment at which the size criterion and switch time range criterion are met, and at the latest when the maximum size is reached.

When a blockchain BSX-Y has taken over from another BSX-(Y−1), i.e. the blockchain BSX-Y contains up-to-date information allowing normal continuity of the application system/project, it may be necessary not to be limited only to immediate information, i.e. to a snapshot of the data at the time of the start of migration, but to include the data of a past period preceding the start of migration. This past period is called the memory period or remanence period. It may be defined so as to contain the past information required by the application projects/systems to correctly handle the blockchain BSX-Y.

When a blockchain BSX-Y has replaced another blockchain BSX-(Y−1), in the majority of cases, the BSX-(Y−1) blockchain cannot be halted (i.e. decommissioned and taken offline) before the blockchain BSX-Y is fully functional. It is thus necessary to wait until all the application projects/systems have migrated from BSX-(Y−1) to BSX-Y. The time allowed for this migration is defined as the permitted migration duration. The permitted migration duration of a blockchain is before the date on which the new blockchain BSX-Y is switched to and may be the result of a predictive computation. The correctness of the result of the predictive computation will be higher if the variation in the size of the blockchain may be predicted (regular progression, at best linear).

Supervisory Zones

The master (200) comprises, for each blockchain under the supervision of the master (200), a zone for storage of supervisory data, which zone is also called here the technical zone or supervisory zone (250), and which is accessible, solely in read-only mode, by the users of the blockchain in question. This supervisory zone (250) makes it possible to store and exchange all the information necessary for the connection to the blockchain in question, whether this blockchain is a first blockchain of a new time series or a blockchain replacing a previous blockchain in an already existing time series. The supervisory zone (250) is further used to parameterize the use of the blockchain during the permitted migration duration.

The supervisory zone of a blockchain may be specific to a single blockchain version or indeed common to all the blockchains of the blockchain time series to which this blockchain belongs. In the example of FIG. 2A, a single supervisory zone (250) is used for the various blockchains of a blockchain time series:

a common supervisory zone ZTBS1 is associated with the blockchain time series BS1-1, . . . BS1-42, . . . BS1-kk;

a common supervisory zone ZTBS26 is associated with the blockchain time series BS26-1, . . . BS26-23, . . . BS1-ll;

a common supervisory zone ZTBSxx is associated with the blockchain time series BSxx-1, . . . BSxx-15, . . . BSxx-mm.

The supervisory zone (250) of a blockchain may comprise the creation parameters of the blockchain in question.

The supervisory zone (250) of a secondary blockchain (220) (BS26) may comprise the connection parameters associated with the secondary blockchain (220) (BS26) in question.

In the remainder of the description, it will be assumed for the sake of simplicity that a single supervisory zone is used for a secondary blockchain time series (BSX), and the corresponding supervisory zone will be denoted ZTBSX.

The supervisory zone (250) may comprise the associated user rights and the user addresses for connection to each secondary blockchain BSX-Y in question. The supervisory zone (250) of a secondary blockchain BSX-Y stores, for example for each user Z, the user address (173) AM-BSX-Y-Z in association with the rights D-BSX-Y-Z associated with this user address (173) to the blockchain in question. If for example the rights of a user to a secondary blockchain (220) are suppressed then the supervisory zone (250) mentions it, just as the supervisory zone (250) comprises data specifying the rights obtained by a user at a particular user address (173).

Directory

As illustrated by FIG. 2B, the master (200) stores in memory a user directory (230). This user directory (230) comprises a first part, here called the master (200) directory (230), composed of niches, called master niches (231). A master niche NM-Z (231) is a storage space (corresponding to one or more data blocks) associated with a user Z (with Z=Z0, Z1, Z2, etc.) of the master (200) and is configured to store the user address (173) A-M-Z allocated to this user Z for connection to the master (200). The user address (173) A-M-Z allocated to a user for connection to the master (200) is called the master address here.

A master niche NM-Z (231) is configured to further store a business card of this user Z (with Z=Z0, Z1, Z2, etc.) in association with the master address of this user. The business card is a storage space in which the identity of the user is detailed, for example in compliance with the regulations in force. The business card of a user may comprise public and/or private information about that user such as last name, first name, alias, etc. Depending on operating mode, this identity card may be managed by the user himself or by the administrator of the master (200). A user scoring system may be implemented and openly participated in by all other users of the master (200): in this case the business card may be used to store this type of scoring information.

The technical manager (also called the administrator) of a secondary blockchain is also identified in a business card in the directory of the master, just like any other user. In the case of a secondary blockchain time series, there may be one administrator per secondary blockchain version or a single administrator for all the versions of a blockchain time series.

The user directory (230) comprises a second part, here called the secondary directory, composed of niches called secondary niches (232). A secondary niche NBSX-Y-Z (232) is a storage space (corresponding to one or more data blocks) associated with a user Z and a given secondary blockchain BSX-Y. A secondary niche NBSX-Y-Z (232) is used to reference a user Z (with Z=Z0, Z1, Z2, etc.) of a given secondary blockchain BSX-Y. A secondary niche NBSX-Y-Z (232) is stored in association with that master address A-M-Z and/or business card of that user. The user address (173) AT-BSX-Y-Z (also called the technical address) allocated to this user Z for connection to the secondary blockchain BSX-Y in question is stored in a secondary niche NBSX-Y-Z (232) in association with the user profile for this secondary blockchain. The user address (173) AT-BSX-Y-Z allocated to a user Z for connection to the secondary blockchain BSX-Y is also called the secondary address here. The user profile comprises the rights of the user to the secondary blockchain in question.

The directory (230) may be structured by sub-blockchain such that the niches associated with users having access to a sub-blockchain are grouped together. For example, the directory (230) may be structured into hives, with one hive per secondary blockchain, this hive comprising the niches associated with this secondary blockchain.

In one or more embodiments, a multi-signature address (180) (also called the "business address") AM-BSX-Y-Z is generated from two addresses: on the one hand, the user address (173) AT-BSX-Y-Z allocated to user Z for connection to the secondary blockchain BSX-Y, and on the other hand the administrator address AT-BSX-Y-Z0 of the administrator of the secondary blockchain BSX-Y. This multi-signature address (180) is used to perform operations on the secondary blockchain (220) BSX-Y, and hence the technical administrator of the secondary blockchain BSX-Y is able to perform operations on behalf of this user Z1. The one or more digital signature operations of business transactions in the blockchain BSX-Y are performed: either by means of the secondary address AT-BSX-Y-Z1 when they are requested by the user Z1, or by means of the administrator address AT-BSX-Y-Z0, when they are requested by the technical administrator of the blockchain BSX-Y.

Catalog

As illustrated in FIG. 2B, the master (200) also stores in memory a catalog (240) of secondary blockchains (see FIG. 2B). This catalog (240) lists the secondary blockchains supervised by the master (200) and the descriptions respectively associated with these secondary blockchains. The catalog (240) further comprises for each secondary blockchain (220) (BS26 for example) a link to the supervisory zone (250) (ZTBS26 for example) of this secondary blockchain (220). For example in FIG. 2B, the catalog (240) contains a data block (241) that points to the supervisory zone ZTBS26 (250) of the secondary blockchain BS26. The supervisory zone ZTBS26 (250) comprises a data block (251) associated with user Z, which stores, in association, a multi-signature address AM-BS26-Y-Z allocated to user Z for transaction signing in the secondary blockchain BS26 and the rights D-BS26-Y-Z of user Z to the secondary blockchain BS26.

The blockchains to which a user is capable of connecting may multiply. These blockchains may correspond to related applications, such that a need for centralized management and/or control of connections to various blockchains results.

Regarding connection to a blockchain, it is possible to envisage various embodiments.

According to a first exemplary embodiment, a method for connecting to a blockchain is implemented by one or more computers and comprises: receiving a request for connection to the blockchain, the blockchain being a secondary blockchain, to which access is supervised via a main blockchain; allocating to the user a secondary address for connection to the secondary blockchain; storing, in the main blockchain, in a user directory, the secondary address; recording, in the main blockchain, in a supervisory zone of the secondary blockchain, the rights of the user to the secondary blockchain granted by the administrator of the secondary blockchain; authenticating the user by means of the secondary address following a request for connection to the secondary blockchain. Such a method allows a user to connect to at least one secondary blockchain independently of the blockchain while allowing centralized management and supervision of the connections to the various secondary blockchains.

In one or more embodiments, the method according to the first exemplary embodiment comprises: receiving a request to record a transaction, sent by the user via a multi-signature address generated from the secondary address and from a user address of an administrator of the secondary blockchain; and the user signing the transaction by means of the signature corresponding to the secondary address.

In one or more embodiments, the method according to the first exemplary embodiment comprises storing, in the main blockchain, a catalog of secondary blockchains, the catalog comprising, for each secondary blockchain, a description and a link to a supervisory zone of the secondary blockchain in question. The method may comprise: searching for at least one secondary blockchain in the blockchain catalog on the basis of search criteria entered by a user; and obtaining, in the supervisory zone of the secondary blockchain in question, parameters for connection to the secondary blockchain corresponding to the search criteria.

In one or more embodiments, the method according to the first exemplary embodiment may comprise: connecting the user to the main blockchain by means of a main address allocated to that user; reading, by means of a main address, from the user directory, the secondary address of the user and the multi-signature address; reading, from the main blockchain, from the supervisory zone of the secondary blockchain, the rights of the user that are stored in association with the multi-signature address read; receiving a request for access of the user to the secondary blockchain and authenticating the user on the basis of the secondary address read; connecting the user to the secondary blockchain upon successful authentication.

In one or more embodiments of the method according to the first exemplary embodiment, the secondary address allocated to a user for connection to the blockchain is stored in the user directory in association with the multi-signature address.

In one or more embodiments of the method according to the first exemplary embodiment, the rights of a user to the second blockchain are recorded in the supervisory zone in association with the multi-signature address allocated to that user.

The various embodiments mentioned above may be combined with one another, with regard to implementation of the method according to this first exemplary embodiment.

According to a second exemplary embodiment, a computational device or computer system comprises means for implementing the method according to the first exemplary embodiment. These means may comprise one or more processors and one or more memories comprising a computer program code, the one or more memories and the computer program code being configured to, with the one or more processors, cause the device to execute the steps of the method according to the first exemplary embodiment. For example, the one or more memories comprise a computer program comprising instructions configured to cause the device to execute the steps of the method according to the first exemplary embodiment.

In one or more embodiments, the various steps of the method according to the first exemplary embodiment are implemented by one or more computer programs.

According to a third exemplary embodiment, a data storage medium readable by a processor on which is stored a computer program comprising instructions for executing the steps of a method according to the first exemplary embodiment when the instructions are implemented by one or more computer programs.

According to a fourth exemplary embodiment, a computer program product comprises instructions for executing the steps of a method according to the first exemplary embodiment when the computer program is executed by a data processor.

An exemplary method for connecting a user to a blockchain will now be described in detail with reference to FIGS. 3A and 3B. To simplify the description, the exemplary case of a connection to one particular secondary blockchain (220) BS26 will be described, but it is applicable to any other secondary blockchain (220).

Although the steps of this method are presented sequentially, the order of execution of these steps may be modified, some of the steps may be executed at least partly in parallel, and/or some of the steps may be omitted or repeated.

By way of example, reference will be made to FIG. 1A, and it will be assumed that the master blockchain corresponds to blockchain instances 140, 141, 142, that the administrator of the master corresponds to user Z0 and that the node of the administrator of the master therefore corresponds to the node 100.

Step 300: Storing the Catalog in the Master

A catalog (240) of secondary blockchains is stored in the master. This catalog (240) comprises, for each secondary blockchain (220), a description and a link to a supervisory zone (250) of the secondary blockchain (220) in question. This information may be stored as the secondary blockchains are created and as updates are made to these secondary blockchains.

The catalog may be stored under the supervision of the administrator Z0 of the master. For example, with reference to FIG. 1A, this storage is achieved by means of the computational device 150 in the instance 140 of the master. It will be noted that, at this stage, the instances 141 and 142 of the master may not exist if users Z1 and Z2 have not yet registered with the master. In the case where these instances exist, a synchronization takes place so as to update the various instances 141 and 142 of the master.

Step 305: Connection of the User to the Master (200)

The user Z1 connects to the master (200) by means of a computational device 151 of the node 101. The user is authenticated on the basis of his master address (173) AM-Z1, which is allocated to him for access to the master, and of associated authentication data (for example a password inter alia).

By way of example, reference will be made to FIG. 1A, and it will be assumed that this user is the user Z1 of the node 101. Thus, the operations (for example, reading or writing data, searching for data, etc.) performed by the user Z1 on the master will be performed by means of the software associated with the master executed by the computational device 151 of the node 101 of the user Z1. Likewise, the operations (for example, reading or writing data, transactions, etc.) performed by the user Z1 on a given secondary blockchain, BS26 for example, will be performed by means of the software associated with the secondary blockchain BS26, which will be executed by the computational device 151 of the node 101 associated with the user Z1.

It may be a question of the first connection to the master, i.e. of the phase in which a user wishes to obtain a user address (173) (serving as identifier) A-M-Z1 for connection to the master (200) and the rights relating to the master (200) that come with this user address (173) A-M-Z1. This first connection may be achieved using any known connecting procedure. Thus, after the first successful authentication, the master address A-M-Z1 of the user Z1 is stored, by means of the software associated with the master executed by the computational device 151 of the node 101, in the master niche NM-Z1 (231) of this user. It may be stored in association with the business card of the user Z1.

In the case where a user loses the means to connect and wishes to access the master (200) again, this may correspond, technically, to a first authentication. To be connected to the master (200), it is usually necessary to request access rights via a communication channel other than the master (200), in order to be able to finalize access to the master (200).

Subsequently, for each secondary blockchain (220) to which the user connects, the secondary address (or technical address) AT-BSX-Y-Z1 of the user Z1 for the secondary blockchain (220) is stored in the niche NBSX-Y-Z1 (232) of the secondary blockchain (220) in question and contains a reference to the business card of the user and/or the master address of the user.

After successful authentication, a user Z1 obtains access to the master (200), and in particular to the directory (230) and to the catalog (240). In particular, a new instance 141 of the master is created in node 101. In the case of full nodes, this new instance is a complete copy of the instance 140 of the master of the administrator node 100 associated with the administrator Z0.

As with all the operations whereby data are stored in the master, a synchronization takes place between the various instances 140, 141, 142 of the master blockchain. For example, with reference to FIG. 1A, if it is assumed that the master blockchain corresponds to the blockchain instances 140, 141, 142, and if the master blockchain instance 141 is modified in node 101 as a result of storage of the master address A-M-Z1 of user Z1 in the master niche NM-Z1 (231), the instances 140 and 142 are also updated in the other nodes 100 and 102, respectively.

Step 310: Accessing the Catalog (240) and Searching for a Blockchain

After the user has connected to the main blockchain, the master (200) presents the catalog (240) of the secondary blockchains supervised by the master (200). Following a first authentication, the catalog (240) thus allows the user to see all the secondary blockchains managed.

A search (310) for at least one secondary blockchain (220) is carried out, in the blockchain catalog (240), on the basis of search criteria entered by a user. As explained above, this search is carried out by means of the software associated with the master executed by the computational device 151 of the node 101 of the user Z1.

Step 320: Obtaining Connection Parameters for Connection to the Secondary Blockchain.

Since the catalog (240) is linked to the supervisory zones of the secondary blockchains, it makes it possible to find the connection parameters present in the supervisory zone of each secondary blockchain (220).

Thus, the user Z1 obtains from the master, by means of the software associated with the master executed by the computational device 151, parameters for connection to a secondary blockchain BS26 corresponding to the search criteria or to a secondary blockchain BS26 selected by the user. These connection parameters are read from the supervisory zone (250) of the secondary blockchain BS26 in question. Depending on the storage mode (full node or light-weight node), the supervisory zone (250) may be stored in the various instances 140, 141, 142 of the master or only in the instance 140 of the node 100 of the administrator Z0 of the master.

When a user Z1 finds and selects in the catalog (240) a secondary blockchain, for example BS26, to which the user wishes to connect (for example, after a search by keywords in the description of the secondary blockchain), the user thus obtains, via the supervisory zone ZTBS26 of the secondary blockchain BS26, connection parameters that will allow him to register with the secondary blockchain BS26.

Step 330: Connecting to the Secondary Blockchain

This step concerns a first connection of the user to the secondary blockchain selected beforehand, this blockchain being a secondary blockchain BS26 access to which is supervised via the master.

The user sends, by means of a computational device (151), a connection request to the secondary blockchain BS26 using the connection parameters obtained in step 320. In practice, when the secondary blockchain BS26 forms part of a series of blockchains, connection will be to the current version Y of the secondary blockchain. Thus, the blockchain concerned by steps 340 to 380 will be denoted BS26-Y, but these steps are applicable in the same way to an isolated blockchain not forming part of a series. This connection request is made by means of the software associated with the secondary blockchain BS26-Y executed by the computational device 151 of the node 101 of the user Z1.

Step 340: Allocating Technical Address and Multi-Signature Address

The user obtains in return a user address (173) AT-BS26-Y-Z1 (secondary address, or technical address), which serves as identifier for connection to the secondary blockchain BS26-Y.

After enrolment in the directory and allocation of the address AM-BS26-Y-Z1, the user Z1 further obtains the multi-signature address (180) AM-BS26-Y-Z1 that is allocated thereto for signature of transactions to be recorded in the name of this user in the secondary blockchain BS26-Y. The multi-signature address (180) is generated from the secondary address AT-BS26-Y-Z1 and from a technical address AT-BS26-Y-Z0 (or administrator address) of an administrator of the secondary blockchain BS26-Y. For the sake of simplicity of the description and notations, it will be assumed that the administrator of the secondary blockchain BS26-Y is the user Z0 of node 100, just as was the case for the master. However, it could be another user, user Z2 of node 102 for example.

The secondary address AT-BS26-Y-Z1 (173) and the multi-signature address (180) AM-BS26-Y-Z1 are generated by the software associated with the secondary blockchain BS26-Y, which is executed by means of the computational device 150 of the administrator node 100 of the secondary blockchain BS26-Y, under the control of the administrator Z0 of the secondary blockchain BS26-Y. During this step 340, the software associated with the secondary blockchain BS26-Y, which is executed by means of the computational device 150 of the administrator node 100 of the secondary blockchain BS26-Y, is thus in communication with the software associated with the secondary blockchain BS26-Y, which is executed by means of the computational device 151 of the node 101 associated with the user Z1.

The multi-signature address (180) AM-BS26-Y-Z1 is based on two signatures: on the one hand, the signature of the user that was obtained from the secondary address AT-BS26-Y-Z1, and, on the other hand, the signature of the technical manager (or administrator) that was obtained from the address AT-BS26-Y-Z0 of the administrator Z0 of the secondary blockchain BS26-Y. The multi-signature address (180) AM-BS26-Y-Z1 is determined such that it requires only one signature out of the two possible signatures.

Step 350: Storing in the Directory (230) of the Master (200).

The multi-signature address (180) AM-BS26-Y-Z1 is stored in the master in the secondary directory (230) as a business address for the blockchain BS26-Y. The multi-signature address (180) AM-BS26-Y-Z1 is stored, in the niche NBS26-Y-Z1 of the secondary blockchain BS26-Y in question, in association with the technical address AT-BS26-Y-Z1 so that an explicit link exists between the two addresses.

Only the administrator of the secondary blockchain BS26-Y possesses write rights to the supervisory zone of the secondary blockchain BS26-Y and to the secondary directory associated with the secondary blockchain BS26-Y. These rights of the administrator of the secondary blockchain BS26-Y to the master were requested beforehand from the master via an external process. Thus the master is stored in the directory in the instance 140 of the master, by the software associated with the secondary blockchain BS26-Y, which is executed by means of the computational device 150 of the administrator node 100 of the secondary blockchain BS26-Y, under the control of the administrator Z0 of the secondary blockchain BS26-Y. Subsequently, via a synchronization mechanism, the other instances 141 and 142 of the master are updated in the associated nodes 101 and 102.

The user Z1 has read rights to the master niche NBS26-Y-Z1 of the directory associated with him. After synchronization of the master instances, the user Z1 may read the multi-signature address (180) AM-BS26-Y-Z1 and the technical address AT-BS26-Y-Z1 from this master niche NBS26-Y-Z1 by means of the software associated with the master, which is executed by means of the computational device 151 of the node 101 associated with the user Z1.

Step 360: Recording Rights.

Rights to the secondary blockchain BS26-Y are allocated to the user by the administrator of the secondary blockchain BS26-Y. Just as was the case for address generation, rights to the secondary blockchain BS26-Y are allocated by the software associated with the secondary blockchain BS26-Y, which is executed by means of the computational device 150 of the administrator node 100 of the secondary blockchain BS26-Y, under the control of the administrator Z0 of the secondary blockchain BS26-Y. The rights D-BS26-Y-Z1 granted to the business address AM-BS26-Y-Z are recorded in the master (200) in the supervisory zone ZTBS26 of the secondary blockchain BS26-Y. These rights D-BS26-Y-Z1 are recorded by the administrator of the blockchain BS26-Y in association with the multi-signature address (180) AM-BS26-Y-Z1 in the supervisory zone ZTBS26 of the secondary blockchain BS26-Y. These rights and address are recorded in the supervisory zone ZTBS26 of the master in the instance 140 of the master, by the software associated with the secondary blockchain BS26-Y, which is executed by means of the computational device 150 of the administrator node 100 of the secondary blockchain BS26-Y, under the control of the administrator Z0 of the secondary blockchain BS26-Y. Next, via a synchronization mechanism, the other instances 141 and 142 of the master are updated in the associated nodes 101 and 102.

The user Z1 has read rights to data from the supervisory zone ZTBS26 that concerns him. After synchronization of the instances of the master, user Z1 may read the rights D-BS26-Y-Z1 recorded in the supervisory zone ZTBS26 by means of the software associated with the master, which is executed by means of the computational device 151 of the node 101 associated with the user Z1.

Step 370: Connecting to the Secondary Blockchain BS26-Y.

The user uses the technical address AT-BS26-Y-Z1 to connect to and access the secondary blockchain BS26-Y. The user is authenticated on the basis of his user address (173) AT-BS26-Y-Z1 and of associated authentication data (a password for example). This connection is made by means of the software associated with the secondary blockchain BS26-Y, which is executed by means of the computational device 151 of the node 101 associated with the user Z1.

Step 380: Recording a Transaction in the Secondary Blockchain BS26-Y.

The user sends, by means of his computational device 151, to the secondary blockchain BS26-Y a request to record a transaction. This transaction record request is sent from the multi-signature address AM-BS26-Y-Z1. This request is sent by the software associated with the secondary blockchain BS26-Y, which is executed by means of the computational device 151 of the node 101 associated with the user Z1.

The transaction sent via the multi-signature address AM-BS26-Y-Z1 (in the case where the transaction meets the required validation conditions) is signed by the user by means of the signature corresponding to the secondary address AT-BS26-Y-Z1, i.e. the signature used to generate the multi-signature address AM-BS26-Y-Z1.

During use of a secondary blockchain BS26-Y, any transaction between two or more users is carried out from one multi-signature address (180) to another multi-signature address (180). Depending on the rights granted and the envisioned applications, transactions may make it possible to create assets, to create asset units, to send asset units, or to perform transactions that contain data unrelated to an asset or any other action enabled by the technology of the secondary blockchain BS26-Y within the extent of rights granted.

After validation of the transaction, one or more data blocks are stored in the secondary blockchain BS26-Y. If it is assumed here, by way of example, that the secondary blockchain BS26-Y corresponds to the instances 130, 131, 132 described with reference to FIG. 1A, these data blocks are thus stored in the instance 131 of the secondary blockchain BS26-Y, by the software associated with the secondary blockchain BS26-Y, which is executed by means of the computational device 151 of the node 101 associated with user Z1. Next, via a synchronization mechanism, the other instances 130 and 132 of the corresponding secondary blockchain BS26-Y are (as required and depending on the full-node/light-weight-node mode) updated in the associated nodes 100 and 102.

Migrating a Secondary Blockchain

A method for migrating a secondary blockchain will now be described in more detail with reference to FIGS. 4A and 4B.

Although the steps of this method are presented sequentially, the order of execution of these steps may be modified, certain of the steps may be executed at least partly in parallel, and/or certain of the steps may be omitted or repeated. Depending on the chosen physical/hardware architecture, the steps of this method regarding a blockchain may be carried out by one or more of the physical entities (computers) implementing the functions of this blockchain in at least one node.

This migrating method is implemented in such a way as to retain only certain information of the migrated secondary blockchains, the application information for example. In this way the memory space occupied by the replacement secondary blockchain is small compared to the memory space occupied by the replaced blockchain. During this migration, the master (200) in a way acts as the orchestrator of the migration in that it behaves as a communication hub supervising the migration.

A blockchain is migrated under the supervision of the administrator of BS26 and with the corresponding software 160 (in particular the software subset 160B, which is reliant on the software subset 160A), implemented on the node of the administrator Z0.

A blockchain is preferably migrated in such a way as to guarantee a continuity of service for the applications (application projects/systems) implemented by this blockchain.

In the example below, the current secondary blockchain (220) BSX-(Y−1) (i.e. BS26-23 if for example X=26 and Y=24) is migrated to a new secondary blockchain (220) BSX-Y (i.e. BS26-24 if for example X=26 and Y=24).

In an initial step 400, a migration start date is computed by the administrator of the current secondary blockchain (220). This computation may be carried out in a number of ways.

In one embodiment, the end of migration is computed, for example at regular time intervals. Based on the end of migration, the start of the switch time range is computed and, based on the switch time range and/or the end of migration, the start of the permitted migration duration is computed. Based on the end of migration, the start of a buffer period is also computed.

In step 410, at the start of the permitted migration duration, the new secondary blockchain BS26-Y is initialized and stored (connection parameters, migration parameters, description, and other useful parameters) in the master (200) on request by the administrator of the current secondary blockchain (220), this new secondary blockchain being intended to replace a secondary blockchain to be replaced.

A supervisory zone is created in the main blockchain for the new secondary blockchain. Either the supervisory zone ZTBS26 is completed if only one supervisory zone is used for the series of blockchains, or a new supervisory zone ZTBS26-Y is created in the master (200) for the new secondary blockchain BS26-Y if one supervisory zone specific to each version is used. This supervisory zone ZTBS26-Y comprises the creation parameters of the new secondary blockchain BS26-Y, these creation parameters possibly being identical to or different from the creation parameters of the current secondary blockchain BS26-(Y−1). As described above, this supervisory zone is intended to store the associated user rights and the user addresses for connection to the secondary blockchain in question.

Optionally, a new description of the new secondary blockchain BS26-Y is stored in the catalog (240) of the master (200) or the description of the series of the secondary blockchain BS26-Y is updated.

These operations of storing the master in the directory and catalog are executed by the administrator Z0 of BS26 via the software associated with the master, by means of the computational device 150 of the administrator node 100 of the current secondary blockchain BS26-23, under the control of the administrator Z0 of the current secondary blockchain BS26-23.

The migration of the various instances of the current secondary blockchain BS26-23 that exist in the various nodes 100, 101, 102 will be triggered at the same time by the administrator Z0 of BS26. Subsequently, these various instances will be migrated using the same migrating method as described below with regard to steps 420 to 460 for the administrator node, possibly at different rates depending on the capacities and resources of the node in question. What happens to one of the instances in a node 100, 101 or 102 is described below.

In step 420, after initialization of the new secondary blockchain BS26-Y, the enrolment period begins and all the users wishing or needing to enroll on the new secondary blockchain BS26-Y are invited to connect thereto and to store, in the directory (230) of the master (200), their new technical address for this new secondary blockchain BS26-Y.

For each new enrolment on the new secondary blockchain BS26-Y, the business address and the technical address of the user in question are stored in the master in the directory (230) associated with the new secondary blockchain, as described by reference to FIGS. 3A and 3B. Only the administrator of the new secondary blockchain BS26-Y possesses write rights to the supervisory zone of the new secondary blockchain BS26 and to the secondary directory associated with the secondary blockchain BS26. Thus the master is stored in the directory in the instance 140 of the master, under the control of the administrator Z0 of the secondary blockchain BS26-Y, via the software associated with the secondary blockchain BS26-Y, which is executed by means of the computational device 150 of the administrator node 100 of the secondary blockchain BS26-Y. Subsequently, via a synchronization mechanism, the other instances 141 and 142 of the master are updated in the associated nodes 101 and 102. It will be recalled here that there may be a single administrator for all the blockchains of a time series or indeed one administrator per blockchain version. During the enrolment period, user rights may be modified or not renewed.

On each new enrolment of a user on the new secondary blockchain, a new instance of this secondary blockchain is created in the node corresponding to the user in question.

When the directory (230) of the new secondary blockchain has been completed with all or some of the business addresses of the current secondary blockchain BS26-(Y−1), rights are assigned to all the business addresses (multi-signature addresses) allocated for the new secondary blockchain BS26-Y. The technical addresses remain without rights, or alternatively with send rights but without receive rights for all the corresponding users, such that the state of the new secondary blockchain remains frozen until step 450 in which users are switched. In particular, no new data blocks may be generated in the new secondary blockchain.

In step 430, the initializing period, which is referred to as "business initialization", begins after allocation of rights to business addresses. In this step 430, the administrator of the new secondary blockchain BS26-Y, having the right to sign each multi-signature business address, generates, with the business addresses (multi-signature addresses) of the owner users, in the new blockchain, a set of data blocks corresponding to an image of the first blockchain. These data blocks are signed by the administrator by means of the administrator address of the secondary blockchain BS26-Y. This image corresponds to a determined point in time in the history of the first blockchain. For example, each asset and each asset unit is recreated and asset units are allocated to user addresses in such a way that the image of the data of the new secondary blockchain BS26-Y is identical to the image of the data of the old secondary blockchain BS26-(Y−1) in terms of assets held by users.

The point in time of generation of the image corresponds to the start of the memory period of the old secondary blockchain BS26-(Y−1). The operations performed in the past on the old secondary blockchain BS26-(Y−1) during a time period of duration equal to the memory period of the old secondary blockchain BS26-(Y−1) are further performed on the new secondary blockchain BS26-Y so as to replicate the corresponding relevant part of the history of the blockchain BS26-(Y−1).

As illustrated in FIG. 4A, the initial image is generated at the point in time T0, corresponding to the start of the memory period. Subsequently, the operations carried out during a time period of duration T1-T0 are replicated in the new secondary blockchain BS26-Y so that, following this replication, the state of the new secondary blockchain BS26-Y corresponds to the current state of the old blockchain at the point in time T1. The point in time T1 also corresponds to the start of the migration period.

This image is generated in a local instance of the new secondary blockchain BS26-Y, by the software associated with the new secondary blockchain BS26-Y, which is executed by means of the computational device 150 of the administrator node 100 of the new secondary blockchain BS26-Y, under the control of the administrator Z0 of the new secondary blockchain BS26-Y. Since no users are enrolled, there are no other instances of the new secondary blockchain BS26-Y for which synchronization is required.

After the business initialization period, the period referred to as the mirroring period begins, this corresponding to step 440. During this mirroring period, the old secondary blockchain BS26-(Y−1) coexists with the new secondary blockchain BS26-Y and remains accessible for all operations in accordance with rights granted. Furthermore, during the mirroring period, new operations (transactions inter alia) performed under the control of the administrator Z0 on the old secondary blockchain BS26-(Y−1), via the software associated with the secondary blockchain BS26-(Y−1), are also performed under the control of the administrator Z0 on the new secondary blockchain BS26-Y, via the software associated with the secondary blockchain BS26-Y, so that the image of the data still remains identical, at the point in time t, in both secondary blockchains BS26-Y and BS26-(Y−1). These new transactions are transactions for which the blockchain to be replaced or the replacement blockchain has received a record request. In the case where such a transaction involves a user who has not yet enrolled on the new blockchain, the enrolment of this user may be simulated by creating and assigning him a secondary address and a multi-signature address and enrolments on the new blockchain are requested by the administrator of the new blockchain by means of the multi-signature address of this user and signed with the secondary address of this administrator.

During the mirroring period, any new block created in the new or old blockchain is also duplicated via a synchronization mechanism in each of the existing instances of the new or old blockchain.

The user switch period begins after the start of the mirroring period and corresponds to step 450. As illustrated in FIG. 4A, this user switch period may occur at least partially in parallel with the mirroring period. At the start of the switch time range, rights are allocated to technical addresses and systems/projects using the old secondary blockchain and having rights to the new secondary blockchain are permitted to switch to the new secondary blockchain BS26-Y. To record the switch of a user, a marker is stored, by means of the software associated with the master, under the control of the administrator Z0, for this user, in the master (200) that comprises the identifier of the secondary blockchain to which is connected a user. A marker indicates whether a user has switched or not to the replacement blockchain. In practice, the switch of a user thus corresponds to a switch of the rights of this user to the replacement blockchain (whether these rights are or are not identical in both these blockchains).

From the moment when the value of the marker is modified, new transactions are redirected so as to be recorded appropriately. Thus, if the user was on the blockchain BS26-(Y−1) to be replaced then it is the replacement blockchain BS26-Y that is updated with the software associated with BS26-Y, on behalf of the user, to keep it identical to the blockchain BS26-(Y−1) to be replaced. A contrario, after the user has migrated to the replacement blockchain BS26-Y it is blockchain BS26-(Y−1) to be replaced that is updated with the software associated with BS26-(Y−1), on behalf of the user, so as to keep an identical image of the data on the two blockchains, while some users are still connected to one of the two blockchains and other users to the other of the two blockchains. It will be noted that this image has no memory of the past, since, as explained above with respect to the creation of the starting image in step 430, transactions prior to the start of the memory period are not replicated, only the distribution of assets between users at the start of the memory period being replicated in the new blockchain.

During the migration, the master serves as a communication registry in that the master makes it possible to determine to which version of the secondary blockchain a user must connect at a given moment of the migration process, by virtue in particular of the marker stored for this user. The two blockchains coexist for the duration of the mirroring period, during which users may be migrated from one chain to the other, each at different points in time and unconstrainedly. In addition, as a new blockchain is being computed, the computing time required to start the new chain is as low as it can be.

Once all the users have migrated to the new secondary blockchain BS26-Y, and no later than the scheduled migration end date, then the old secondary blockchain BS26-(Y−1) is halted in step 460. This step corresponds to the switch between the old secondary blockchain BS26-(Y−1) and the new secondary blockchain BS26-Y. This switch between secondary blockchains is permanent so that any new transaction is recorded only in the new blockchain, hence no more transactions may be recorded in the old blockchain BS26-(Y−1) and any new transaction is recorded solely in the new blockchain BS26-Y. The mirroring period therefore ends and all rights, except possibly the connection right (set of rights "Connect" described with reference to FIG. 1D) are withdrawn from user addresses for the old secondary blockchain BS26-(Y−1). Keeping connection rights alone does not allow users to delete their local instance on the old secondary blockchain BS26-(Y−1), but only to reconnect to it and find all historical data therein (read rights) if required.

Restricted rights to the old secondary blockchain are recorded in the master in the supervisory zone of the old blockchain in a local instance of the master, by the software associated with the master, which is executed by means of the computational device 150 of the administrator node 100 of the old secondary blockchain, under the control of the administrator Z0 of the old secondary blockchain.

If all the users (except the administrator) are bereft of rights to the old secondary blockchain other than connection rights, no changes could be made to the old secondary blockchain, which therefore serves as an archive with respect to the new secondary blockchain. It is also possible to envisage the rights of the administrator being reduced in one way or another.

A user Z1 has the ability to delete the local instance in his node 101 of old blockchain versions for which migration has ended. Specifically, any information relating to transactions prior to the migration (prior to the migration period) is kept in the node of the administrator of BS26, so it is not necessary to keep it in the other nodes.

After the switch to the new secondary blockchain, any new user is obliged to use the new secondary blockchain BS26-Y from the moment at which the old secondary blockchain BS26-(Y−1) is halted, to be able to continue to use the functionalities associated with this secondary blockchain BS26.

In all the methods described in this document, the master has a supervisory role but does not determine how rights are allocated to users in the various secondary blockchains. The role of the master is therefore to declare and store information relating to the supervised blockchains.

An administrator of a secondary blockchain could not store the rights allocated to users in the master and rely solely on a mechanism for managing these rights that is internal to the secondary blockchain to determine which rights to apply. The rights of an administrator to the master could in this case be withdrawn.

Migration of the Master

The master (200) is the entity that manages the secondary blockchain migrations in a given time series of secondary blockchains. Technically, the master (200) is a blockchain just like secondary blockchains. Thus, the master (200) may also exceed a maximum limit size, for example a limit size tolerated by users. It may therefore be necessary to replace the master (200) in the same way as secondary blockchains are replaced.

The current master (200) may thus be replaced by a new master (200), by following the same migrating method as the secondary blockchains, the only difference being that the migration data are free-standing, i.e. the current master (200) itself stores all the data required to migrate users from the current master (200) to the new master (200).

In one or more embodiments, the creation parameters of a new master (200) contain, in addition to the creation parameters described with respect to secondary blockchains, a pointer to the previous master (200), this allowing users who have been active to better use the history stored in the previous master (200) if required.

The various methods described in this document may be implemented by one or more programmed computers. Thus, in the present document, certain representations are also intended to cover devices for storing computer programs, for example digital data storage media, that are machine- or computer-readable and that encode instructions executable by a machine or by a computer, wherein the instructions allow all or some of the steps of the methods described in this document to be implemented.

The functions of the various elements shown in the figures, including the functional blocks called "processors", may be performed using dedicated hardware as well as hardware capable of executing software in conjunction with appropriate software. When they are performed by a processor, the functions may be performed by a single dedicated processor, by a single shared processor, or by a plurality of individual processors, certain of which may be shared. Other conventional and/or specific hardware may also be included.

This document thus relates to a computer program, capable of being executed by a computer or by a data processor, this computer program comprising instructions for commanding the execution of the steps of a method or of a plurality of the methods described in this document.

This computer program may use any programming language, and take the form of source code, of object code or of code intermediate between source code and object code, such as code in a partially compiled form, or any other desirable form.

The instructions are intended to be stored in a memory of a computational device 150, 151, 152 in order to be processed (read, interpreted, etc.) with a view to their execution by one or more processors of this device.

The computational device 150, 151, 152 may be implemented by one or more physically separate machines. The device may on the whole have the architecture of a computer, and include components of such an architecture: one or more data memories, one or more processors, a communication bus, one or more hardware interfaces for connecting this device to a network or another piece of equipment, one or more user interfaces, etc.

Further, the term "processor" must not be understood to exclusively mean hardware capable of executing software, and may encompass purely hardware components: a digital signal processor (DSP), a network processor, an application-specific integrated circuit (ASIC), a field-programmable gate array (FPGA), etc.

The present description also relates to a computer-readable data storage medium, whether transient or not, and comprising instructions of a computer program such as mentioned above. The data storage medium may be any entity or device capable of storing the computer program. For example, the data storage medium may comprise one or more ROMs or RAMs, one or more flash memories, one or more digital memories, one or more magnetic storage media such as magnetic disks and magnetic tapes, hard disks or optically read digital data storage media, etc.

The invention claimed is:

1. A method for migrating a blockchain to be replaced, called the first blockchain, to a replacement blockchain, called the second blockchain, the method being implemented by one or more computers and comprising:
   initializing the second blockchain, said initializing comprising generating, in a main blockchain configured to supervise access to the first and second blockchains, a supervisory zone of the second blockchain;
   enrolling one or more users on the second blockchain, said enrolling a user comprising storing, in a user directory in the main blockchain, a secondary address allocated to this user for connection to the second blockchain;
   generating, in the second blockchain, a set of data blocks corresponding to an image of the first blockchain, the image corresponding to a determined point in time in the history of the first blockchain;
   switching all or some of the users from the first blockchain to the second blockchain so as to prohibit transactions from being recorded in the name of these users in the first blockchain and to permit transactions to be recorded in the name of these users in the second blockchain.

2. The method as claimed in claim 1, further comprising recording new transactions for which the first blockchain has received a record request both in the first blockchain and in the second blockchain during a period, which is referred to as the mirroring period, before said switching.

3. The method as claimed in claim 1, wherein the supervisory zone of the second blockchain is configured to record user rights to the second blockchain.

4. The method as claimed in claim 1, comprising permanently switching to the second blockchain by modifying the rights of the users to the first blockchain, so that no more transactions may be recorded in the first blockchain and any new transaction is recorded only in the second blockchain.

5. The method as claimed in claim 1, wherein the first blockchain is implemented in a communication system comprising a plurality of nodes and one instance of the first chain in each node, the method comprising, for at least one node of the communication system, following the permanent switch, deleting the instance of the first blockchain located in the node in question.

6. The method as claimed in claim 1, comprising allocating each user of the second blockchain a multi-signature address for signing transactions to be recorded in the second blockchain in the name of that user, the multi-signature address being generated on the basis of the secondary address allocated to this user for connection to the second blockchain and an administrator address of the second blockchain.

7. The method as claimed in claim 6, wherein the secondary address allocated to a user for connection to the second blockchain is stored in the user directory in association with the multi-signature address.

8. The method as claimed in claim 6, wherein the multi-signature address is used to record new transactions in the second blockchain during the mirroring period.

9. The method as claimed in claim 6, wherein the rights of a user to the second blockchain are recorded in the supervisory zone in association with the multi-signature address allocated to that user.

10. The method as claimed in claim 1, wherein generating the image of the first blockchain comprises storing, in the second blockchain, a set of data blocks representative of asset units held by one or more users of the first blockchain at the determined point in time.

11. The method as claimed in claim 1, comprising storing, in the main blockchain, a marker for each user indicating whether or not that user has switched to the second blockchain.

12. A computer system comprising one or more processors and one or more memories comprising a computer program code, the one or more memories and the computer program code being configured to, with the one or more processors, cause the computer system to execute steps of a method comprising
   Initializing the second blockchain, said initializing comprising generating, in a main blockchain configured to supervise access to the first and second blockchains, a supervisory zone of the second blockchain;
   Enrolling one or more users on the second blockchain, said enrolling a user comprising storing, in a user directory in the main blockchain, a secondary address allocated to this user for connection to the second blockchain;
   generating, in the second blockchain, a set of data blocks corresponding to an image of the first blockchain, the image corresponding to a determined point in time in the history of the first blockchain;
   switching all or some of the users from the first blockchain to the second blockchain so as to prohibit transactions from being recorded in the name of these users in the first blockchain and to permit transactions to be recorded in the name of these users in the second blockchain.

13. A non-transitory computer-readable medium storing computer-executable instructions that, when executed by at least one processor, cause a computer system to perform steps of a method comprising:
   Initializing the second blockchain, said initializing comprising generating, in a main blockchain configured to supervise access to the first and second blockchains, a supervisory zone of the second blockchain;
   enrolling one or more users on the second blockchain, said enrolling a user comprising storing, in a user directory in the main blockchain, a secondary address allocated to this user for connection to the second blockchain;
   generating, in the second blockchain, a set of data blocks corresponding to an image of the first blockchain, the image corresponding to a determined point in time in the history of the first blockchain;
   switching all or some of the users from the first blockchain to the second blockchain so as to prohibit transactions from being recorded in the name of these users in the first blockchain and to permit transactions to be recorded in the name of these users in the second blockchain.

\* \* \* \* \*